July 31, 1956  G. E. PARKER  2,756,725
COMPENSATED CONDITION CONTROL REGULATOR
Filed Oct. 21, 1954

INVENTOR.
George E. Parker
BY

United States Patent Office 2,756,725
Patented July 31, 1956

2,756,725

COMPENSATED CONDITION CONTROL REGULATOR

George E. Parker, Rockford, Ill., assignor to Woodward Governor Company, Rockford, Ill., a corporation of Illinois Application October 21, 1954, Serial No. 463,753

8 Claims. (Cl. 121—42)

This invention relates to automatic controls incorporating a so-called compensating or resetting mechanism which, after a correcting action of a power servo is initiated in response to a deviation of the condition to be controlled, applies a restoring force to the condition sensing device and then gradually dissipates the force.

The primary object is to provide an automatic control of the above character which responds properly to normal load changes but is relatively insensitive to false changes in the controlled condition.

Another object is to achieve such insensitivity by a simple modification of the controller shown in Patent 2,478,753.

The invention also resides in the novel manner of utilizing the compensating mechanism to distinguish selectively between real and false condition deviations.

Figure 1:
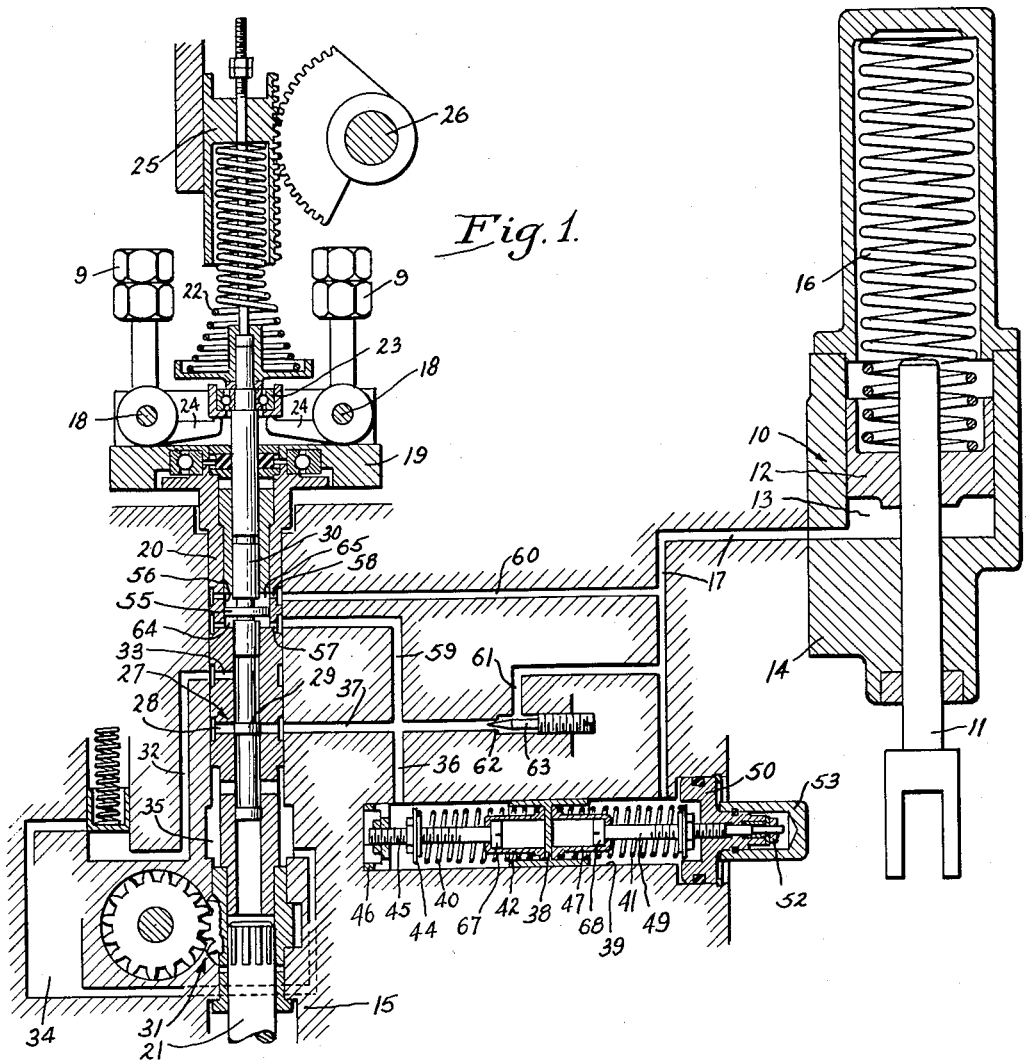

Other objects and advantages of the invention will become apparent from the following detailed description taken in connection with the accompanying drawings, in which Figure 1 is a fragmentary sectional view and hydraulic circuit diagram of a control apparatus embodying the novel features of the present invention.

Figure 2:
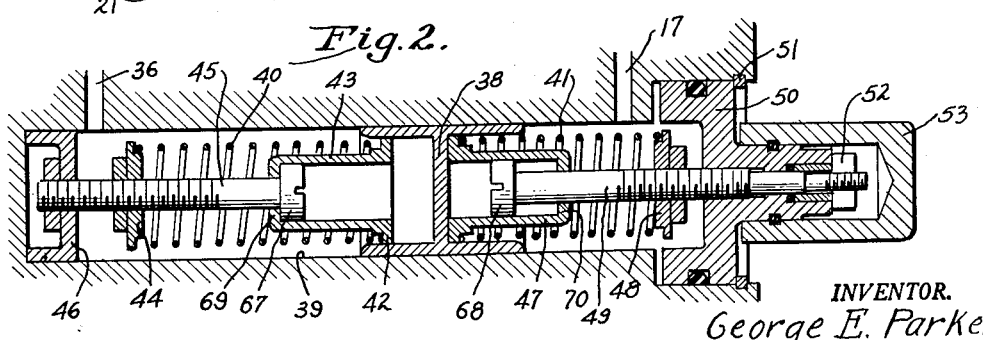

Fig. 2 shows a portion of Fig. 1 in a moved position of the parts.

For purposes of illustration, the invention is shown in the drawings incorporated in a speed governor of the hydraulic type in which a force, variable in direction and magnitude with changes in condition to be controlled, in this instance the speed of a prime mover, governs the operation of a servo actuator 10 for positioning a rod 11 connected to a regulator, such as the throttle of a prime mover, by which changes in the controlled condition may be corrected for. The servo motor shown is of the single acting hydraulic type comprising a piston 12 reciprocable in a stationary cylinder which may be supported within a housing 14 attached to the casing 15 of the governor. The regulator rod 11 is urged in the speed-decreasing direction by a spring 16 which is compressed as the servo chamber 13 is expanded by the admission of fluid under pressure to the rod end of the cylinder through a passage 17.

The means herein employed to detect deviations of the controlled condition or speed from the value desired to be maintained is of the flyball type comprising upstanding weights 9 pivoted at 18 on a rotary head 19. The latter is fast on the upper end of a ported sleeve 20 rotatable in a bushing which is supported in the casing 15. The lower end of the sleeve 20 is spline coupled to a shaft 21 driven by the prime mover which is controlled by the governor.

The centrifugal force acting on the flyballs is balanced against a compression spring 22 bearing downwardly against the inner race of a ball thrust bearing 23 whose outer race is engaged by arms 24 of the flyballs. The speed-setting of the governor may be adjusted by manually turning a shaft 26 to shift a member 25 and thereby vary the speeder spring stress.

In the present instance the control force derived from changes in the flyball speed is applied mechanically to a valve device 27 having parts which are relatively movable in opposite directions away from a predetermined neutral position in response to opposite deviations of the control force away from a value predetermined by the governor speed adjustment. The valve is formed by ports 28 in the sleeve 20 coacting with a land 29 on a stem 30 which is slidable in the rotating sleeve and is connected at its upper end to the inner race of the bearing 23.

Through a passage 32 and a port 33 in the sleeve 20, oil supplied under substantially constant pressure by a pump 31 is delivered into the sleeve above the land 29. The pump inlet communicates with sump spaces 34, one of which is connected through holes 35 with the interior of the sleeve 20 below the land 29.

Pressure fluctuations in the space 37 to which fluid is delivered or from which it is released when the valve is open are communicated to the servo chamber 13 through the intermediary of a wall in the form of a plunger 38 which moves back and forth as the space pressure changes but which is urged toward and at equilibrium occupies the centered position shown in Fig. 1. The plunger is slidable in a cylinder 39 rigid with the casing 15 and communicating at one end with the space 37 through a passage 36 and at the other end with the servo chamber 13 through the passage 17.

The centering action is produced by two coiled springs 40 and 41 disposed in opposite ends of the cylinder 39 for engagement with opposite ends of the plunger. For purposes to appear later, the inner end of the spring 40 bears against a flange 42 on the end of a tube 43 slidable in a hollow extension at one end of the plunger and adapted to bear against one side of the plunger as shown in Fig. 1. The other spring end bears against a nut 44 threaded onto a screw 45 which in turn threads through a plug 46 pressed into the cylinder end. In a similar way, the other spring 41 engages a tube 47 which is urged by the spring toward the other side of the plunger 38. The outer end of this spring abuts against a nut 48 on a screw 49 projecting through a plug 50 to close the end of the cylinder 39, the plug being held by a snap ring 51. A nut 52 on the outer end of the screw 49 clamps the latter adjustably in the plug 50 which is covered by a cap 53 sealed around the outer end of the plug.

As described in the aforesaid patent, the transmission of each pressure change from the space 37 to the servo chamber 13 through the intermediary of the spring centered plunger 38 produces a pressure difference which is applied to the control device 27 to derive the desired compensating action or temporary droop so as to provide in the case of a speed governor, true isochronous operation. Herein, the modifying forces are exerted on a piston 55 fast on the valve stem 30 and slidable in a cylinder 56 whose opposite ends communicate through properly restricted ports 57 and 58 with passages 59 and 60 respectively leading to the valve outlet space 37 and the servo chamber 13. A pressure increase in the space 37 due to lowering of the valve stem acts on the lower end of the piston 55 to return the stem 30 to neutral position. Conversely, a reduction in pressure relative to that in the servo chamber 13 resulting from raising of the valve stem, causes a resultant downward pressure on the piston 55.

To dissipate the droop producing force and restore the control point of the system to the desired value so as to provide for true isochronous operation of a prime mover, the passages 59 and 60 are connected through a by-passage 61 having an adjustable restriction 62 therein formed by a needle valve 63. The latter permits the leakage of fluid back and forth between the space 37 and the servo chamber 13 thus dissipating each pressure differential at a rate determined by the setting of the needle valve.

The operation of the structure thus far described is set forth fully in the aforesaid patent. To summarize, the parts will be disposed in the centered positions shown in Fig. 1 when equilibrium has been attained. If the load on the prime mover is increased and the speed thereby decreased, the flyballs will move in, allowing the speeder spring 22 to move the control land 29 downwardly to uncover the ports 28 and permit a flow of pressure fluid to the passage 37 and the left end of the cylinder 39, forcing the plunger 38 to the right against the action of the spring 41 and the lower pressure then prevailing in the servo chamber 13. Fluid is thus forced out of the other end of the cylinder and into the servo chamber 13, and the prime mover regulator 11 is moved upwardly to increase the fuel supply.

As an incident to this, the pressure in the lower compensating chamber 64 is increased above that in the upper chamber 65 by an amount proportional to the movement of the plunger 38, resulting in the application to the receiving piston 55 of an upwardly directed restoring force. The drooping characteristic thus produced is maintained by the action of the spring 41 on the piston 38 but starts to dissipate immediately by fluid leakage through the restricted by-pass 62 between the chambers 64 and 65. As the pressure differential decreases, the speed at which a given valve opening is maintained is brought closer to the normal speed setting of the governor until the normal speed has been restored fully when the pressure differential has been dissipated completely and the piston 38 returned to centered position, the system then being in equilibrium.

If the load on the prime mover decreases resulting in a speed increase, the valve land 29 is raised by the flyballs and the energization of the servo is reduced by movement of the piston 38 to the left against the action of the spring 40. A pressure differential is thus created between the chambers 64 and 65 resulting in a force applied to the receiving piston 55 in a downward direction. As before, the droop thus produced is dissipated by the leakage through the needle valve, the normal speed of the prime mover being restored when equilibrium again obtains with the return of the buffer piston 38 to centered position.

In the automatic controller above described, it will be apparent that during normal operation, each change in the position of the servo piston 12 is produced by a displacement of the plunger 38. Secondly, changes in the valve outlet pressure are transmitted to the compensating piston 55 through a hydraulic connection separate from the connection leading to the servo.

The present invention takes advantage of these characteristics to minimize the correcting action which the controller attempts to make in response to the detection of false condition changes. An example of such a false change is the momentary speed deviation which results from misfiring of a gas engine. Since no load change has occurred, it is preferred that the governor ignore such brief and erratic power changes and respond only to continuing speed deviations that result from true changes in the load on the engine.

To render the controller insensitive to such false condition changes, the invention contemplates preloading at least one of the springs 40 and 41 in a novel manner so as to prevent displacement of the plunger 38 and therefore of the servo piston until the pressure differential between the space 37 and the servo chamber 13 has increased beyond a predetermined value greater than that ordinarily attained in response to misfiring of the engine or other false condition deviations.

In the present instance, each of the springs is preloaded and this is achieved by providing stops 67 and 68 which hold the springs under the compression at all times and limit the expansion of the springs so as to prevent the inner ends of the latter from moving beyond the centered position of the plunger 38, the respective springs being individually compressible in response to movements of the plunger in opposite directions away from the centered position. Herein, the stop 67 comprises a head formed on the inner end of the screw 45 and adapted, when the plunger is in the centered position, to engage an inturned flange 69 on the tube 43 against which the spring 40 abuts. By virtue of this engagement, the tube remains in the normal position when as a result of a substantial pressure increase in the space 37, the plunger 38 is moved out of the centered position and to the right therefrom as shown in Fig. 2.

Similarly, the stop 68 is a head on the screw 49 forming an abutment facing away from the plunger 38 for engagement with an inturned flange 70 on the abutment tube 47 of the spring 41. The stop permits compression of the spring 41 when the plunger 38 is moved to the right as shown in Fig. 2 but acts to limit the reverse movement of the tube 47 to the centered position of the plunger.

As a result of the arrangement of the stops 67 and 68, both springs 40 and 41 engage the plunger 38 in the centered position and maintain this position when the pressures in opposite ends of the cylinder 39 are equalized. When the plunger is moved away from this position as a result of a pressure differential of the proper magnitude, one spring remains of maximum length and in the same position as in the case of the spring 40 in Fig. 2. The other spring 41 becomes compressed by the plunger movement and as a result exerts an increased force tending to return the plunger toward the centered position.

The proper preloading of the springs 40, 41 is attained by adjusting the nuts 44 and 48. Ordinarily, such loading is on the order of a few pounds per square inch over the area of the plunger 38 which means that a greater pressure change must take place in the space 37 before the spring preloading will be overcome and the plunger permitted to move and produce a corresponding pressure change in the servo chamber 13. Until such a pressure change, either a decrease or an increase, occurs the plunger position and therefore the servo piston remains in fixed position and no connection is made even though the valve 27 may be moved by false condition changes.

Although the servo actuator does not respond to small condition changes the compensating mechanism does function in the regular way. This is for the reason that the pressure changes in the space are transmitted directly to the chamber 64 of the compensating cylinder and applied to the piston 55. The entire fluid flow from the pilot valve 27 passes to compensating cylinder except for the leakage that may pass the needle valve and reach the servo chamber. Thus the restoring force for a given pressure change in the space 37 is greater in the case of a false condition change.

The ultimate effect of the preloading of the springs 40 and 41 is to provide a relatively high restoring pressure and stabilizing action on the pilot valve for a very low rate of movement of the servo piston due to the restricted flow through the needle valve. Therefore, small momentary speed errors such as may be caused by misfiring of the engine are prevented from causing large excursions of the servo piston and throttle.

The preloading of the springs 40 and 41 and the resultant action in rendering the controller insensitive to small or momentary condition changes takes place for all positions of the servo piston 12. This is for the reason that after each change in the servo position, the pressures between the space 37 and the chamber 13 are equalized by leakage through the needle valve, this being accompanied by return of the plunger to the centered position. However, the preloading of the springs does not change the overall action of the controller in adjusting the servo piston to correct for true load changes, the latter producing pressure differentials of magnitudes greater than the preloading.

Where the false conditions likely to be encountered in service use are always of the same sign, for example, always produce a speed decrease in the case of a governor controlled prime mover, it is of course unnecessary to adapt the controller for ignoring false condition changes of the opposite sign. That is to say, if no false conditions are to be encountered causing the governor above described to detect a false speed increase, the limit stop 67 for the spring 40 may be omitted thus allowing the inner end of this spring to remain in continuous contact with the plunger 38 as the latter moves to the right from the centered position. Then, in response to each detected speed increase, regardless of the magnitude thereof, the resulting pressure reduction in the space 37 would permit the plunger to move to the left immediately under the predominating pressure in the servo chamber.

I claim as my invention:

1. Regulating apparatus having, in combination, a servo piston, means providing a cylinder guiding said piston and cooperating with one end of the piston to provide a closed fluid filled chamber, a fluid filled space, a valve responsive to changes in a control force to admit or release pressure fluid from said space to maintain super-atmospheric pressure therein, a second cylinder communicating at opposite ends with said space and said chamber, a piston in said second cylinder yieldably urged in opposite directions, mechanism responsive to a fluid pressure differential between opposite ends of said second cylinder to apply a restoring force to a part of said valve including a restricted leakage connection between opposite ends of said second cylinder, a third cylinder communicating at opposite ends with said space and chamber respectively, a plunger disposed intermediate the ends of said third cylinder and slidable in either direction outwardly beyond a normally centered position, coiled compression springs, one in each end of said third cylinder for urging said plunger toward said centered position, and a stop unit controlling the contraction and expansion of one of said springs and preloading the same when said plunger is in said centered position, said unit comprising inner and outer fixed abutments spaced along the axis of said plunger and engageable with opposite ends of the associated spring, the inner abutment permitting compression of the spring by movement of the plunger away from said centered position in the direction of the spring but preventing expansion of the spring beyond said centered position of the plunger.

2. Regulating apparatus having, in combination, a fluid servo having an expansible chamber, a fluid space, a cylinder communicating at opposite ends with said space and chamber respectively, a plunger slidable in said cylinder in opposite directions away from a centered position to transmit to said chamber changes in the pressure in said space, a by-passage connecting said space and chamber and having a restriction permitting slow leakage of fluid between the two, means including a valve responsive to changes in the control force to admit pressure fluid to or release the same from said space, compression springs disposed in oppoite ends of said cylinder, normally fixed abutments engaging the outer ends of said springs and adjustable along the axis of said cylinder to vary the loading of said springs, movable abutment members engaging the inner ends of said springs and engageable with opposite ends of said plunger, and stops having abutting engagement with the respective members and each permitting outward movement of its member by compression of the associated spring but limiting the reverse movement of the member to the centered position of said plunger, each of said abutments and the associated stop being spaced apart to maintain the spring under compression when said plunger is in said centered position.

3. Regulating apparatus having, in combination, a fluid servo having an expansible chamber, a fluid space, a cylinder communicating at opposite ends with said space and chamber respectively, a plunger slidable in said cylinder in opposite directions away from a centered position to transmit to said chamber changes in the pressure in said space, a by-passage connecting said space and chamber and having a restriction permitting slow leakage of fluid between the two, means including a valve responsive to changes in a control force to admit pressure fluid to or release the same from said space, compression springs disposed in opposite ends of said cylinder and acting at their inner ends on opposite sides of said plunger, fixed abutments engaging the outer ends of said springs, a movable abutment member engaging the inner end of one of said springs and engageable with one end of said plunger, and a stop having abutting engagement with said member and permitting outward movement thereof by compression of the associated spring but limiting the reverse movement of the member to the centered position of said plunger, said stop and the associated abutment being spaced apart to maintain the spring under compression when said plunger is in said centered position.

4. Regulating apparatus having, in combination, a fluid servo having an expansible chamber, a fluid space, a wall separating said space and chamber and movable in opposite directions away from a centered position to transmit to said chamber changes in the pressure in said space, a by-passage connecting said space and chamber and having a restriction permitting slow leakage of fluid to equalize the pressure between the two, means including a valve responsive to changes in a control force to admit pressure fluid to or release the same from said space, two springs acting on said wall and respectively operable to resist movement of said wall in opposite directions away from said centered position, stops for the respective springs maintaining predetermined preloading thereof when said wall is in centered position and confining the movements of the wall by the respective springs to two ranges disposed on opposite sides of said centered position, and means for applying the pressure differentials between said space and chamber to said valve in a direction to restore the same to closed position.

5. Regulating apparatus having, in combination, a fluid servo having an expansible chamber, a fluid space, a wall separating said space and chamber and movable in opposite directions away from a centered position to transmit to said chamber changes in the pressure in said space, a by-passage connecting said space and chamber and having a restriction permitting slow leakage of fluid and equalization of the pressure between the two, means including a valve responsive to changes in a control force to admit pressure fluid to or release the same from said space, two springs acting on said wall to urge the same in opposite directions toward said centered position, both of said springs being stressed when the wall is centered, and stops acting on the respective springs to limit the movement of said wall by either spring beyond said centered position.

6. Regulating apparatus having, in combination, a fluid servo having an expansible chamber, a fluid space, a wall separating said space and chamber and movable in opposite directions away from a centered position to transmit to said chamber changes in the pressure in said space, a by-passage connecting said space and chamber and having a restriction permitting slow leakage of fluid to equalize between the two, means including a valve responsive to changes in a control force to admit pressure fluid to or release the same from said space, two springs acting on said wall and respectively operable to resist movement of said wall in opposite directions away from said centered position, and a stop for each of said springs maintaining predetermined preloading thereof when said wall is in centered position and limiting the movement of the wall by the springs to said centered position.

7. Regulating apparatus having, in combination, a fluid servo having an expansible chamber, a fluid space, a wall separating said space and chamber and movable in opposite directions away from a centered position to transmit to said chamber changes in the pressure in said space, a by-passage connecting said space and chamber and having a restriction permitting slow leakage of fluid between the two, means including a valve responsive to changes in a control force to admit pressure fluid to or release the same from said space, two springs acting on said wall and respectively operable to resist movement of said wall in opposite directions away from said centered position, and a stop for at least one of said springs maintaining predetermined preloading thereof when said wall is in centered position and preventing movement of the wall by such spring beyond such position.

8. Regulating apparatus having, in combination, a fluid servo having an expansible chamber and a movable member closing the chamber, a fluid space, a wall separating said space and chamber and movable in opposite directions away from a centered position to transmit to said chamber changes in the pressure in said space, a by-passage connecting said space and chamber and having a restriction permitting slow leakage of fluid between the two, means including a valve responsive to changes in a control force to admit pressure fluid to or release the same from said space, means responsive to the pressure differential built up between said space and chamber and operable to apply such differential to said valve to return the same toward neutral position, two springs acting on said wall to urge the same in opposite directions away from said centered position, and means for maintaining a predetermined preloading of at least one of said springs when said plunger is in said centered position and thereby maintain the plunger in such position until said pressure differential has increased above a value determined by said preloading.

References Cited in the file of this patent
UNITED STATES PATENTS

| | | |
|---|---|---|
| 2,439,325 | Wiesendanger | Apr. 6, 1948 |
| 2,478,753 | Parker | Aug. 9, 1949 |
| 2,541,805 | Berkey et al. | Feb. 13, 1951 |